United States Patent
Mizuno et al.

(10) Patent No.: US 10,056,595 B2
(45) Date of Patent: Aug. 21, 2018

(54) BATTERY SEPARATOR, AND METHOD FOR PRODUCING SAME

(71) Applicant: Toray Battery Separator Film Co., Ltd., Nasushiobara-shi (JP)

(72) Inventors: Naoki Mizuno, Nasushiobara (JP); Michihiko Irie, Nasushiobara (JP); Ken Shimizu, Nasushiobara (JP)

(73) Assignee: Toray Industries, Inc. (JP)

( * ) Notice: Subject to any disclaimer, the term of this patent is extended or adjusted under 35 U.S.C. 154(b) by 177 days.

(21) Appl. No.: 14/342,875

(22) PCT Filed: Mar. 28, 2013

(86) PCT No.: PCT/JP2013/059164
§ 371 (c)(1),
(2) Date: Mar. 5, 2014

(87) PCT Pub. No.: WO2013/153954
PCT Pub. Date: Oct. 17, 2013

(65) Prior Publication Data
US 2015/0030905 A1    Jan. 29, 2015

(30) Foreign Application Priority Data

Apr. 13, 2012    (JP) ................................. 2012-092314

(51) Int. Cl.
*H01M 2/16* (2006.01)
*H01M 2/14* (2006.01)
*H01M 10/0525* (2010.01)

(52) U.S. Cl.
CPC ......... *H01M 2/1686* (2013.01); *H01M 2/145* (2013.01); *H01M 2/166* (2013.01); *H01M 2/1646* (2013.01); *H01M 2/1653* (2013.01); *H01M 10/0525* (2013.01)

(58) Field of Classification Search
None
See application file for complete search history.

(56) References Cited

U.S. PATENT DOCUMENTS

| | | | | |
|---|---|---|---|---|
| 2003/0180622 A1* | 9/2003 | Tsukuda et al. | | 429/249 |
| 2007/0264577 A1* | 11/2007 | Katayama et al. | | 429/246 |
| 2009/0111025 A1* | 4/2009 | Lee et al. | | 429/251 |
| 2010/0233547 A1 | 9/2010 | Baba et al. | | |

FOREIGN PATENT DOCUMENTS

| | | |
|---|---|---|
| CN | 101809783 | 8/2010 |
| EP | 1 115 166 | 7/2001 |
| JP | 3175730 B2 | 4/2001 |
| JP | 2004-111160 A | 4/2004 |
| JP | 2004-146190 A | 5/2004 |
| JP | 2008-503049 A | 1/2008 |
| JP | 2008-524824 A | 7/2008 |
| JP | 2010-092718 A | 4/2010 |
| WO | 2009/041394 A1 | 4/2009 |
| WO | 2009/041395 A1 | 4/2009 |
| WO | 2013/051079 A1 | 4/2013 |
| WO | 2013/058371 A1 | 4/2013 |

* cited by examiner

*Primary Examiner* — Barbara Lee Gilliam
*Assistant Examiner* — Adam A Arciero
(74) *Attorney, Agent, or Firm* — DLA Piper LLP (US)

(57) ABSTRACT

A battery separator includes a porous membrane A including a polyolefin resin, and a porous membrane B laminated thereon including a fluororesin and inorganic particles or cross-linked polymer particles, wherein the particles are contained in an amount of 80 wt % to 97 wt % of the porous membrane B and have an average diameter being not less than 1.5 times and less than 50 times the average pore size of the porous membrane A, and a specific expression 1 and a specific expression 2 are satisfied.

6 Claims, No Drawings

BATTERY SEPARATOR, AND METHOD FOR PRODUCING SAME

TECHNICAL FIELD

The present invention relates to a battery separator comprising a porous membrane comprising a polyolefin resin, and a porous membrane laminated thereon comprising a fluororesin and inorganic particles or cross-linked polymer particles. The present invention also relates to a battery separator having excellent heat resistance, processability (electrolyte permeability, low curling properties) in a battery assembly process, and ion permeability and being useful as a separator for a lithium ion secondary battery, and a method of producing the same.

BACKGROUND ART

Thermoplastic resin porous membranes have been widely used, for example, as materials for separation, selective permeation, and isolation of substances: e.g., battery separators used in a lithium ion secondary battery, nickel-hydrogen battery, nickel-cadmium battery, and polymer battery; separators for an electric double layer capacitor; various filters such as a reverse osmosis filtration membrane, ultrafiltration membrane, and microfiltration membrane; moisture-permeable waterproof clothing; and medical materials. In particular, polyethylene porous membranes have been suitably used as separators for a lithium ion secondary battery, because they are not only characterized by having excellent electrical insulating properties, having ion permeability due to electrolyte impregnation, and having excellent electrolyte resistance and oxidation resistance, but also have the pore-blocking effect of blocking a current at a temperature of about 120 to 150° C. in abnormal temperature rise in a battery to suppress excessive temperature rise. However, if the temperature continues to rise for some reason even after pore blocking, membrane rupture can occur at a certain temperature as a result of decrease in viscosity of molten polyethylene constituting the membrane and shrinkage of the membrane. In addition, if the membrane is left at a constant high temperature, membrane rupture can occur after the lapse of a certain time as a result of decrease in viscosity of molten polyethylene and shrinkage of the membrane. This phenomenon is not a phenomenon that occurs only when polyethylene is used, and also when any other thermoplastic resin is used, this phenomenon is unavoidable at or higher than the melting point of the resin constituting the porous membrane.

In particular, separators are highly responsible for battery properties, battery productivity, and battery safety, and required to have excellent mechanical properties, heat resistance, permeability, dimensional stability, pore-blocking properties (shutdown properties), melt rupture properties (meltdown properties), and the like. Further, lithium ion secondary batteries, upon demand for cost reduction in recent years, are strongly required to be produced more efficiently. Therefore, it is expected that separators for a lithium ion secondary battery will, in the future, increasingly require higher processability (electrolyte permeability, low curling properties) in a battery assembly process.

In particular, any improvement in electrolyte permeability contributes significantly to battery productivity, which is of extremely great value.

In recent years, techniques using lamination of a heat resistant resin layer on a polyolefin separator membrane have been proposed. Lamination of a heat resistant resin having high affinity for electrolyte solutions improves electrolyte permeability to some degree.

Coating a polyolefin porous membrane with a coating solution containing a heat resistant resin and immersing a polyolefin porous membrane in a coating solution containing a heat resistant resin are a common method for laminating the heat resistant resin layer as described above on a polyolefin porous membrane. However, these methods have a problem of air resistance increase due to clogging of pores of the polyolefin porous membrane caused by lamination of the heat resistant resin. If a polyolefin porous membrane with a larger pore size is used in order to reduce the clogging of pores, an important pore-blocking function, which determines the safety of a separator, will be reduced.

To satisfy these requirements, various studies to improve heat resistance have hitherto been conducted.

PRIOR ART DOCUMENTS

Patent Documents

For example, Patent Document 1 discloses a separator for a lithium ion secondary battery, the separator being obtained by laminating a heat-resistant nitrogen-containing aromatic polymer comprising ceramic powder on a polyolefin porous membrane.

Patent Document 2 and Patent Document 3 disclose a battery separator obtained by laminating a heat-resistant layer comprising inorganic particles and polyamide-imide on a polyolefin porous membrane.

Patent Document 4 discloses a battery separator obtained by immersing a polyolefin porous membrane in a dope mainly composed of polyvinylidene fluoride which is a heat resistant resin and inorganic particles.

Patent Document 5 discloses a battery separator obtained by immersing a polyolefin porous membrane in a dope mainly composed of carboxyl methylcellulose and inorganic particles.

Patent Document 1: Japanese Patent No. 3175730
Patent Document 2: WO 2009/041395
Patent Document 3: WO 2009/041394
Patent Document 4: JP 2008-524824 W
Patent Document 5: JP 2008-503049 W

SUMMARY OF THE INVENTION

Problems to be Solved by the Invention

The separator of Patent Document 1 had a significantly increased air resistance as compared to the case using a polyolefin porous membrane alone because the ceramic powder and the heat-resistant nitrogen-containing aromatic polymer entered pores of the substrate polyethylene porous membrane and caused adhesion. In addition, the electrolyte permeability was not satisfactory.

The battery separators of Patent Document 2 and Patent Document 3 had an increased air resistance, as compared to the case of a polyolefin porous membrane alone, and unsatisfactory curling properties.

The battery separator of Patent Document 4 had an increased air resistance, as compared to the case of a polyolefin porous membrane alone, and unsatisfactory electrolyte permeability. In addition, the important pore-blocking function, which determines the safety of the separator, was poor.

The battery separator of Patent Document 5 was unsatisfactory in both adhesion of a coating layer and electrolyte permeability.

As described above, among battery separators comprising a substrate porous membrane based on polyolefin or the like and a heat resistant resin layer laminated thereon, those which are satisfactory in both the rate of air resistance increase due to lamination of a heat resistant resin layer on a substrate polyolefin porous membrane and processability such as electrolyte permeability and low curling properties are not present in the prior art.

The present invention has excellent heat resistance and processability in a battery assembly process, and has achieved the reduced rate of air resistance increase and improved electrolyte permeability, which are properties difficult to achieve simultaneously in the prior art, by infiltrating a fluororesin, which is a heat resistant resin, in trace amounts deep into pores of a polyolefin porous membrane.

"Infiltrating state in trace amounts" as used herein means that the absorbance of an absorption having a peak at or near 1,200 $cm^{-1}$ attributed to the fluororesin ($absT_{(1200)}$), as measured by infrared spectroscopy (transmission method) after peeling a fluororesin layer (porous membrane B) off a polyolefin porous membrane (porous membrane A), is in the range of 0.01 to 0.30 per 10 μm thickness of the porous membrane A.

"Deep into pores" as used herein means that the absorbance of an absorption having a peak at or near 1,200 $cm^{-1}$ attributed to the fluororesin ($absR_{(1200)}$), as measured by infrared spectroscopy (reflection method) on the polyolefin porous membrane surface (the surface opposite to the porous membrane B), is in the range of 0.001 to 0.030.

The rate of air resistance increase is preferably not more than 130%, more preferably not more than 120%, and most preferably not more than 110%.

Means for Solving the Problems

To solve the problems described above, the battery separator of the present invention has the following constitution:
A battery separator, comprising: a porous membrane A comprising a polyolefin resin, and a porous membrane B laminated thereon comprising a fluororesin and inorganic particles or cross-linked polymer particles,
wherein the particles are contained in an amount of 80 wt % to 97 wt % of the porous membrane B and have an average diameter being not less than 1.5 times and less than 50 times the average pore size of the porous membrane A, and Expression 1 and Expression 2 are satisfied.

$$0.01 \leq absT_{(1200)} \leq 0.30 \quad \text{Expression 1}$$

$absT_{(1200)}$: Absorbance of an absorption having a peak at or near 1200 $cm^{-1}$ per 10 μm thickness of the porous membrane A, as measured by infrared spectroscopy (transmission method) after peeling the porous membrane B off the porous membrane A; and $$0.001 \leq absR_{(1200)} \leq 0.030 \quad \text{Expression 2}$$

$absR_{(1200)}$: Absorbance of a maximum peak at or near 1200 $cm^{-1}$, as measured by infrared spectroscopy (reflection method) on the surface of the porous membrane A that is opposite to the porous membrane B The method of producing the battery separator of the present invention has the following constitution:
A method of producing the battery separator described above, comprising the following steps (i) and (ii).

Step (i): Applying a coating solution (varnish) to the porous membrane A comprising a polyolefin resin, the coating solution comprising a fluororesin and inorganic particles or cross-linked polymer particles, wherein the concentration of the fluororesin in the solution component is 1 wt % to 3.5 wt %, and then passing the coated porous membrane A through a humidity-controlled zone at an absolute humidity of 5 $g/m^3$ or more but less than 10 $g/m^3$ for 3 seconds or more but less than 30 seconds to form a membrane comprising the fluororesin on the porous membrane A.

Step (ii): Immersing the composite membrane obtained in the step (i), in which the membrane comprising the fluororesin is laminated, in a coagulation bath to convert the membrane comprising the fluororesin into a porous membrane B, and washing and drying the composite membrane to obtain a battery separator.

In the battery separator of the present invention, the inorganic particles are preferably at least one selected from silica, titanium dioxide, and alumina.

In the battery separator of the present invention, the cross-linked polymer particles are preferably at least one selected from cross-linked polystyrene particles, cross-linked acrylic resin particles, and cross-linked methyl methacrylate particles.

Effects of the Invention

The battery separator of the present invention, in which a resin component mainly composed of a fluororesin is present in trace amounts deep in pores of a polyolefin porous membrane A, not only has excellent heat resistance and processability (low curling properties), but also is characterized in that the rate of air resistance increase due to lamination of a heat resistant resin is extremely low and that it has excellent electrolyte permeability; therefore, it can be suitably used as a separator for a lithium ion secondary battery.

BEST MODE FOR CARRYING OUT THE INVENTION

The battery separator of the present invention comprises a porous membrane A comprising a polyolefin resin and a porous membrane B laminated thereon comprising a fluororesin and inorganic particles or cross-linked polymer particles. The present invention provides, through the use of a specific varnish and a highly-controlled coating technique mentioned below, a battery separator in which electrolyte permeates at a high speed because the fluororesin enters deep into pores of the porous membrane A comprising a polyolefin resin, but the rate of air resistance increase due to lamination of the fluororesin is extremely small because the fluororesin enters into the pores of the porous membrane A in trace amounts.

First, the porous membrane A used in the present invention will be described.

The resin that constitutes the porous membrane A is a polyolefin resin and may be a single substance, a mixture of two or more different polyolefin resins, for example, a mixture of polyethylene and polypropylene, or a copolymer of different olefins. In particular, polyethylene and polypropylene are preferred. This is because polyethylene and polypropylene have, in addition to basic properties such as electrical insulating properties and ion permeability, the pore-blocking effect of blocking a current in abnormal temperature rise of a battery to suppress excessive temperature rise.

The mass average molecular weight (Mw) of the polyolefin resin is not critical, and is typically $1 \times 10^4$ to $1 \times 10^7$, preferably $1 \times 10^4$ to $15 \times 10^6$, and more preferably $1 \times 10^5$ to $5 \times 10^6$.

The polyolefin resin preferably comprises polyethylene. Examples of polyethylenes include ultra-high molecular weight polyethylene, high-density polyethylene, medium-density polyethylene, and low-density polyethylene. Further, examples of polymerization catalysts include, but are not limited to, Ziegler-Natta catalysts, Phillips catalyst, and metallocene catalysts. These polyethylenes may be not only a homopolymer of ethylene but also a copolymer containing a small amount of any other α-olefin. Examples of suitable α-olefins other than ethylene include propylene, 1-butene, 1-pentene, 1-hexene, 4-methyl-1-pentene, 1-octene, (meth) acrylic acid, esters of (meth) acrylic acid, and styrene.

The polyethylene may be a single substance, but is preferably a polyethylene mixture of two or more polyethylenes. As the polyethylene mixture, a mixture of two or more ultra-high molecular weight polyethylenes having different Mws, or a mixture of high-density polyethylenes, medium-density polyethylenes, and low-density polyethylenes, each having different Mws, may be used, or a mixture of two or more polyethylenes selected from the group consisting of ultra-high molecular weight polyethylene, high-density polyethylene, medium-density polyethylene, and low-density polyethylene may be used.

In particular, a preferred polyethylene mixture is a mixture of ultra-high molecular weight polyethylene with a Mw of not less than $5 \times 10^5$ and polyethylene with a Mw of not less than $1 \times 10^4$ and less than $5 \times 10^5$. The Mw of the ultra-high molecular weight polyethylene is preferably $5 \times 10^5$ to $1 \times 10^7$, more preferably $1 \times 10^6$ to $15 \times 10^6$, and particularly preferably $1 \times 10^6$ to $5 \times 10^6$. As the polyethylene with a Mw of not less than $1 \times 10^4$ and less than $5 \times 10^5$, any of high-density polyethylene, medium-density polyethylene, and low-density polyethylene can be used, and in particular, it is preferable to use high-density polyethylene. As the polyethylene with a Mw of not less than $1 \times 10^4$ and less than $5 \times 10^5$, two or more polyethylenes having different Mws may be used, or two or more polyethylenes having different densities may be used. When the upper limit of the Mw of the polyethylene mixture is not more than $15 \times 10^6$, melt extrusion can be easily carried out. The content of high-molecular-weight polyethylene in the polyethylene mixture is preferably 1 wt % or more, and preferably 10 to 80 wt %.

The ratio of the Mw to the number average molecular weight (Mn) of the polyolefin resin, or the molecular weight distribution (Mw/Mn), is not critical, but is preferably in the range of 5 to 300, more preferably 10 to 100. When the Mw/Mn is in this preferred range, a polyolefin solution is easily extruded, and, in addition, the resulting microporous membrane will have high strength. Mw/Mn is used as an index of molecular weight distribution; namely, in the case of a polyolefin composed of a single substance, a larger value means a wider molecular weight distribution. The Mw/Mn of the polyolefin composed of a single substance can be adjusted as appropriate by means of multistage polymerization of the polyolefin. The Mw/Mn of a mixture of polyolefins can be adjusted as appropriate by adjusting the molecular weight and mixing ratio of components.

The phase structure of the porous membrane A varies depending on the production method. As long as the various features described above can be satisfied, a phase structure for the intended purpose can be provided unrestrictedly depending on the production method. Examples of the method of producing a porous membrane include the foaming process, phase separation method, dissolution and recrystallization method, stretching pore-forming process, and powder sintering process, among which the phase separation method is preferred in terms of uniform micropores and cost.

Examples of the production method according to the phase separation method include a method comprising melt-blending, for example, polyolefin with a solvent for film formation, extruding the resulting molten mixture through a die, cooling the extrudate to form a gel-like product, stretching the gel-like product obtained in at least one direction, and removing the solvent for film formation to obtain a porous membrane.

The porous membrane A may be a monolayer membrane or a multilayer membrane comprising two or more layers which are different, for example, in pore size and thermal properties. A multilayer membrane comprising two or more layers can be produced by a method comprising melt-blending each of the polyolefins constituting, for example, a layer and b layer with a solvent for film formation, feeding the resulting molten mixtures from each extruder to one die to integrate gel sheets constituting each component, and co-extruding the integrated gel sheets, or a method comprising laminating gel sheets constituting each layer and heat-fusing the laminate. The co-extrusion method is preferred because a high interlayer adhesive strength is easily achieved; high permeability is easily maintained because continuous pores are easily formed between layers; and productivity is high.

The porous membrane A needs to have a function of blocking pores in the case of abnormal charge and discharge reaction. Accordingly, the melting point (softening point) of the constituent resin is preferably 70 to 150° C., more preferably 80 to 140° C., and most preferably 100 to 130° C. When the melting point (softening point) of the constituent resin is in this preferred range, the pore-blocking function will not be activated in normal use, which allows a battery to be used, while the pore-blocking function is rapidly activated if an abnormal reaction proceeds, which ensures sufficient safety.

The thickness of the porous membrane A is preferably 5 μm or more but less than 50 μm. The upper limit of the thickness is more preferably 40 μm, and most preferably 30 μm. The lower limit of the thickness is more preferably 10 μm, and most preferably 15 μm. When the thickness of the porous membrane A is in this preferred range, a membrane strength and pore-blocking function of practical use can be provided, and, in addition, the electrode area per unit volume of a battery case will not be restricted, which is suitable for increase in battery capacity.

The upper limit of the air resistance (JIS P 8117) of the porous membrane A is preferably 500 sec/100 cc Air, more preferably 400 sec/100 cc Air, and most preferably 300 sec/100 cc Air. The lower limit of the air resistance is preferably 50 sec/100 cc Air, more preferably 70 sec/100 cc Air, and most preferably 100 sec/100 cc Air. When the air resistance of the porous membrane A is in this preferred range, a battery will have sufficient charge and discharge properties, in particular, sufficient ion permeability (charge and discharge operating voltage) and lifetime (closely related to the amount of electrolytic solution retained), and, in addition, sufficient mechanical strength and insulation properties are provided, which eliminates the possibility of a short circuit during charge and discharge.

The upper limit of the porosity of the porous membrane A is preferably 70%, more preferably 60%, and most preferably 55%. The lower limit of the porosity is preferably 30%, more preferably 35%, and most preferably 40%. When the porosity of the porous membrane A is in this preferred range, a battery will have sufficient charge and discharge properties, in particular, sufficient ion permeability (charge and discharge operating voltage) and lifetime (closely related to the amount of electrolytic solution retained) and, in addition, sufficient mechanical strength and insulation properties are provided, which eliminates the possibility of a short circuit during charge and discharge.

The average pore size of the porous membrane A is preferably 0.01 to 0.5 µm, more preferably 0.1 to 0.3 µm, because it has a great influence on pore-blocking speed. When the average pore size of the porous membrane A is in this preferred range, polyamide-imide resin readily enters deep into the pores of the porous membrane A. Consequently, sufficient electrolyte permeability is provided, and air resistance will not significantly decrease upon lamination; in addition, a pore-blocking phenomenon responds to temperature sufficiently quickly, and a pore-blocking temperature that depends on the temperature rise rate will not shift to higher temperatures.

Next, the porous membrane B used in the present invention will be described.

The porous membrane B comprises a fluororesin and inorganic particles or cross-linked polymer particles. The porous membrane B serves to support and reinforce the porous membrane A with its heat resistance. Thus, the glass transition temperature of the fluororesin is preferably 150° C. or higher, more preferably 180° C. or higher, and most preferably 210° C. or higher. The upper limit is not particularly limited. When the fluororesin has a glass transition temperature higher than its decomposition temperature, it is preferred that the decomposition temperature be in the above range. When the glass transition temperature of a polyamide-imide resin constituting the porous membrane B is in this preferred range, a sufficient thermal-rupture-resistant temperature can be achieved, and high safety can be ensured.

The reason for using a fluororesin is that the fluororesin is wettable by common electrolyte solutions (e.g., polycarbonate electrolyte solution) and has excellent adhesion to electrodes.

The fluororesin used in the present invention will be now described.

As a fluororesin, it is preferable to use at least one selected from the group consisting of vinylidene fluoride homopolymer, vinylidene fluoride/fluorinated olefin copolymer, vinyl fluoride homopolymer, and vinyl fluoride/fluorinated olefin copolymer. Polytetrafluoroethylene is particularly preferred. These polymers have high affinity for nonaqueous electrolyte solution, proper heat resistance, and high chemical and physical stability to nonaqueous electrolyte solution, and therefore can maintain an affinity for electrolyte solution sufficiently even when used at high temperatures.

The porous membrane B is obtained by applying a fluororesin solution (varnish), which is obtained by dissolution in a solvent that is able to dissolve a fluororesin and miscible with water, to a given porous membrane A, causing phase separation between the fluororesin and the solvent miscible with water under humidified conditions, and then placing the coated membrane A into a water bath (coagulation bath) to coagulate the fluororesin. A phase separation agent may optionally be added to the varnish.

Examples of solvents that can be used to dissolve the fluororesin include N,N-dimethylacetamide (DMAc), N-methyl-2-pyrrolidone (NMP), hexamethylphosphoric triamide (HMPA), N,N-dimethylformamide (DMF), dimethyl sulfoxide (DMSO), γ-butyrolactone, chloroform, tetrachloroethane, dichloroethane, 3-chloronaphthalene, parachlorophenol, tetralin, and acetonitrile, and the solvent can be arbitrarily selected depending on the solubility of resins.

The phase separation agent used in the present invention is at least one selected from water, alkylene glycols such as ethylene glycol, propylene glycol, tetramethylene glycol, neopentyl glycol, and hexanediol, polyalkylene glycols such as polyethylene glycol, polypropylene glycol, and polytetramethylene glycol, water-soluble polyesters, water-soluble polyurethanes, polyvinyl alcohols, carboxymethylcellulose, and the like. The phase separation agent is preferably added in an amount in the range of 1 to 9 wt %, more preferably 2 to 8 wt %, and still more preferably 3 to 7 wt %, based on the solution weight of the varnish.

By adding such a phase separation agent(s) to the varnish, mainly, air resistance, surface porosity, and rate of formation of layer structure can be controlled. Through the addition of a phase separation agent(s) in an amount in such a preferred range, the rate of phase separation significantly increases, and, moreover, the coating solution will not become cloudy at the mixing stage to precipitate the resin component.

The logarithmic viscosity of the fluororesin is preferably 0.5 dL/g or more. The lower limit of the logarithmic viscosity is preferably not more than 1.8 dL/g. When the logarithmic viscosity of the fluororesin is in this preferred range, sufficient meltdown properties are provided, and a sufficient anchoring effect and excellent adhesion are provided because the porous membrane is not brittle; at the same time, the resin easily enters deep into the pores of the polyolefin porous membrane A, and $absR_{(1220)}$ cannot be too small.

The solvent that can be used to dissolve the fluororesin may be any solvent if it can dissolve the resin and has an affinity for the polyolefin porous membrane B, and examples thereof include N,N-dimethylacetamide (DMAc), N-methyl-2-pyrrolidone (NMP), hexamethylphosphoric triamide (HMPA), N,N-dimethylformamide (DMF), dimethyl sulfoxide (DMSO), γ-butyrolactone, chloroform, tetrachloroethane, dichloroethane, 3-chloronaphthalene, parachlorophenol, tetralin, acetone, and acetonitrile. These solvents may be used alone or in combination.

For the resin concentration in the solution component in the varnish, excluding the particle component, the upper limit is preferably 3.5 wt %, more preferably 3.0 wt %, and the lower limit is preferably 1.0 wt %, more preferably 1.5 wt %.

When the resin concentration in the solution component is in this preferred range, $absR_{(1220)}$ cannot be too small, whereby sufficient adhesion is provided, and it is easy to perform coating because of an appropriate amount of the varnish to be applied. At the same time, $absT_{(1220)}$ and $absR_{(1220)}$ cannot be too large, whereby the amount of the fluororesin that penetrates into the pores of the porous membrane A is appropriate, and the rate of air resistance increase of the separator cannot be high.

In the present invention, to reduce curling, it is important that inorganic particles or cross-linked polymer particles be present in the porous membrane B. Further, the presence of inorganic particles or cross-linked polymer particles in the porous membrane B produces effects of preventing internal short circuit due to the growth of dendrites on an electrode inside a battery (dendrite-preventing effect), reducing the heat shrinkage rate, providing slip characteristics, and the like. For the presence of inorganic particles or cross-linked polymer particles in the porous membrane B, inorganic particles or cross-linked polymer particles may be added to the varnish. The upper limit of the particles content in the porous membrane B is preferably 97 wt %, more preferably 95 wt %. The lower limit is preferably 80 wt %, more preferably 85 wt %. When the amount of the particles added is in this preferred range, a sufficient curling-reducing effect is produced; at the same time, the percentage of the fluororesin relative to the total volume of the porous membrane B is appropriate, and the resin sufficiently enters deep into the pores of the porous membrane A, resulting in sufficient adhesion of the porous membrane B.

Examples of inorganic particles include calcium carbonate, calcium phosphate, silica, crystalline glass filler, kaolin, talc, titanium dioxide, alumina, silica-alumina composite oxide particles, barium sulfate, calcium fluoride, lithium fluoride, zeolite, molybdenum sulfide, and mica. Alumina, titanium dioxide, and silica are suitable in terms of availability and cost.

Examples of cross-linked polymer particles include cross-linked polystyrene particles, cross-linked acrylic resin particles, and cross-linked methyl methacrylate particles. The upper limit of the average diameter of these particles is 25 µm, preferably 5 µm, and more preferably 1 µm. The lower limit is 0.02 µm, preferably 0.10 µm, and more preferably 0.3 µm.

The relationship between the average pore size of the porous membrane A and the average diameter of these particles is as follows: the average diameter of the particles is 1.5 times to 50 times the average pore size of the polyolefin porous membrane A, preferably 1.8 times to 20 times, and more preferably 2.0 times to 5 times.

When the average diameter of the particles is in this preferred range, the fluororesin and the particles cannot block the pores of the polyolefin porous membrane A in a mixed state, and significant increase in air resistance can be prevented; at the same time, the particles are unlikely to fall off during a battery assembly process, and serious defects in a battery can be prevented effectively.

When the fluororesin is made porous by phase separation in forming a porous membrane B, a phase separation agent may be used to accelerate the processing speed. In the present invention, the amount of the phase separation agent used is preferably less than 12% by mass, more preferably 6% by mass or less, and still more preferably 5% by mass or less, based on the solvent components of the varnish. By adding a phase separation agent in an amount in such a preferred range, the effect of reducing the air resistance increase of a battery separator due to lamination of the porous membrane B is produced; at the same time, the fluororesin can be easily present deep in the pores of the porous membrane A, and $absR_{(1220)}$ cannot be too small.

The thickness of the porous membrane B is preferably 1 to 5 µm, more preferably 1 to 4 µm, and most preferably 1 to 3 µm. When the thickness of the porous membrane B is in this preferred range, membrane strength and insulation properties can be ensured when the porous membrane A melts and shrinks at or higher than its melting point, and at the same time, curling is unlikely to increase, which facilitates handling in downstream processes.

The porosity of the porous membrane B is preferably 30 to 90%, more preferably 40 to 70%. When the porosity of the porous membrane B is in this preferred range, the electrical resistance of the membrane cannot be too high, and it is easy to apply a high current; at the same time, the membrane strength is sufficiently high. The air resistance of the porous membrane B, as measured by a method in accordance with JIS P 8117, is preferably 1 to 600 sec/100 cc Air, more preferably 50 to 500 sec/100 cc Air, and still more preferably 100 to 400 sec/100 cc Air. When the air resistance of the porous membrane B is in this preferred range, high membrane strength is provided, and at the same time, satisfactory cycle characteristics are provided.

The air resistance of the battery separator of the present invention is preferably 50 to 800 sec/100 cc Air, more preferably 100 to 500 sec/100 cc Air, and most preferably 100 to 400 sec/100 cc Air. When the air resistance of the battery separator is this preferred range, sufficient insulation properties are provided, and clogging of foreign substances, short circuit, or membrane rupture cannot occur; at the same time, the membrane resistance is not too high, and charge and discharge properties and lifetime properties in a practical range are provided.

Next, the method of producing the battery separator of the present invention will be described.

The process for producing the battery separator of the present invention comprises the following steps (i) and (ii).

Step (i): Applying a varnish to a porous membrane A comprising a polyolefin resin, the varnish comprising a fluororesin and inorganic particles, wherein the fluororesin concentration in the solution component excluding the particle component is 1 wt % to 3.5 wt %, and then passing the coated porous membrane A through a humidity-controlled zone at an absolute humidity of 5 g/m³ or more but less than 10 g/m³ for 3 seconds or more but less than 30 seconds to form a fluororesin membrane on the porous membrane A; and Step (ii): Immersing the composite membrane obtained in the step (i), in which the fluororesin membrane is laminated, in a coagulation bath to convert the fluororesin membrane into a porous membrane B, and washing and drying the composite membrane to obtain a battery separator.

A description will be given in more detail.

The porous membrane B is obtained by laminating a varnish mainly composed of a fluororesin solution and the particles, the fluororesin solution being obtained by dissolution in a solvent that is able to dissolve a fluororesin and miscible with water, on a porous membrane A comprising a given polyolefin resin using a coating method, placing the laminate in a certain humidity environment to cause phase separation between the fluororesin and the solvent miscible with water, and placing the laminate into a water bath (coagulation bath) to coagulate the fluororesin.

The porous membrane B may be laminated by a method (transcription method) comprising coating a substrate film (e.g., polypropylene film or polyester film) once, placing the coated substrate film in a certain humidity environment to cause phase separation between the fluororesin component and the solvent component, thereby forming a porous membrane B, and then transcribing the porous membrane B onto the porous membrane A to achieve lamination, provided that $absT_{(1200)}$ and $absR_{(1200)}$ are in a given range.

Examples of the method of applying the varnish include reverse roll coating, gravure coating, kiss coating, roll brushing, spray coating, air knife coating, meyer bar coating, pipe doctor method, blade coating, and die coating, and these methods can be used alone or in combination.

In the present invention, it is preferred that, between the coating and placing into a coagulation bath, the coated porous membrane A be passed through a zone in a certain humidity environment (hereinafter referred to as a humidity-controlled zone) over 3 seconds or more. Although the upper limit of the time for passage is not particularly restricted, 30 seconds are enough. During this time, the fluororesin and the solvent undergo phase separation. The humidity-controlled zone is a zone where the upper limit of absolute humidity is controlled at 10 g/m³, preferably 9.5 g/m³, and more preferably 9.0 g/m$^3$, and the lower limit at 5 g/m$^3$, preferably 6 g/m$^3$, and more preferably 7.0 g/m$^3$. When the absolute humidity in the humidity-controlled zone is in this preferred range, the fluororesin does not absorb moisture and gelation does not proceed, and, therefore, the fluororesin is able to penetrate deep into the pores of the porous membrane A, whereby absR$_{(1220)}$ cannot be too small; at the same time, the phase separation between the fluororesin and the solvent proceed sufficiently, and significant increase in air resistance can be prevented.

In the coagulation bath, the fluororesin component coagulates into three-dimensional network. The immersion time in the coagulation bath is preferably 3 seconds or more. When the immersion time in the coagulation bath is in this preferred range, the resin component coagulates sufficiently. Although the upper limit of the immersion time is not restricted, 10 seconds are enough. Although the upper limit is not restricted, 10 seconds are enough.

Further, the unwashed porous membrane described above is immersed in an aqueous solution containing a good solvent for the fluororesin constituting the porous membrane B in an amount of 1 to 20 wt %, more preferably 5 to 15 wt %, and the washing step using pure water and the drying step using hot air at 100° C. or lower are conducted, whereby a final battery separator can be obtained. According to the method described above, the resin finely enters deep into the pores of the polyolefin porous membrane A, and good electrolyte permeability is provided, whereby the rate of air permeability increase can be reduced.

For the washing in the film formation described above, common methods such as warming, ultrasonic irradiation, and bubbling can be used. Further, for keeping the concentration in each bath constant to increase washing efficiency, removing the solution in the porous membrane between the baths is effective. Specific examples include extruding the solution in the porous layer with air or inert gas, squeezing out the solution in the membrane physically with a guide roll, and the like.

The battery separator of the present invention is desirably stored dry, but when it is difficult to store it absolutely dry, it is preferable to perform a vacuum drying treatment at 100° C. or lower immediately before use.

The battery separator of the present invention can be used as a separator for batteries such as secondary batteries such as a nickel-hydrogen battery, nickel-cadmium battery, nickel-zinc battery, silver-zinc battery, lithium ion secondary battery, and lithium polymer secondary battery, and is preferably used as a separator particularly for a lithium ion secondary battery.

EXAMPLES

The present invention will now be described in detail by way of example, but the present invention is not limited to the examples. The measurements in the examples were determined by the following methods.

(1) Measurement of absT$_{(1200)}$

For battery separators obtained in Examples and Comparative Examples, a porous membrane B was completely peeled off with adhesive tape to prepare a sample. The sample prepared was examined for its infrared absorption spectrum by the transmission method under the following conditions. Also for an uncoated porous membrane A used as a blank sample, its infrared absorption spectrum was measured in a similar manner. The absorbance at or near 1,200 cm$^{-1}$ (absT$_{(1200)}$) derived from a fluororesin component was determined by determining the value of an absorption peak height having an absorption maximum in the area within 1,200±20 cm$^{-1}$ and converting the value to an absorbance per 10 μm thickness of the porous membrane A.

The line between tails on both sides of the maximum absorption peak was used as a baseline. When there was large noise, smoothing was performed. All the blank samples (uncoated porous membrane A) were confirmed in advance not to have an absorption having a maximum in the above area.

(Measurement Conditions)
Apparatus: Fourier transform infrared spectrophotometer FT-720 (manufactured by HORIBA, Ltd.)
Detector: DLATGS
Resolution: 4 cm$^{-1}$
Accumulations: 100 times (2) Measurement of absR$_{(1200)}$ For battery separators obtained in Examples and Comparative Examples, the uncoated surface (the surface of a porous membrane A opposite to the surface coated with a porous membrane B) was examined for its infrared absorption spectrum using the reflection method. The infrared absorption spectrum was obtained using the same apparatus and measuring method as used in (1) Measurement of absT$_{(1200)}$ above except the surface to be measured. The absorbance at or near 1200 cm$^{-1}$ (absR$_{(1200)}$) derived from a fluororesin component, was determined from the value of an absorption peak height having an absorption maximum in the area within 1,200±20 cm$^{-1}$.

(3) Thickness

The thickness of a porous membrane A and a battery separator was measured using a contact thickness meter (M-30, digital micrometer manufactured by Sony Manufacturing Corporation). The thickness of a porous membrane A was determined based on a sample obtained by peeling off a porous membrane B from a battery separator. The thickness of a porous membrane B was determined from a difference between the thickness of a battery separator and the thickness of a porous membrane A.

(4) Porosity

A 10-cm square sample was provided, and its sample volume (cm$^3$) and mass (g) were measured; a porosity (%) was calculated from the results obtained using the following equation.

$$\text{Porosity}=(1-\text{mass}/(\text{resin density}\times\text{sample volume}))\times 100$$

The sample volume (cm$^3$) is determined by 10 cm×10 cm×thickness (cm).

(5) Adhesion (Peeling Strength) of Porous Membrane B

Adhesive tape (available from NICHIBAN CO., LTD., No. 405; 24 mm wide) was applied to the porous membrane B surface of battery separators obtained in Examples and Comparative Examples, and the separator was cut to a width of 24 mm and a length of 150 mm to prepare a test sample. A peeling strength at the interface between a porous membrane A and a porous membrane B was measured by the peeling method (peel rate: 500 mm/min, T-peel) under the conditions of 23° C. and 50% RH using a tensile tester ("Tensilon RTM-100" manufactured by A & D Company, Limited). Measurements were made continuously within 100 mm from the start to the end of the measurements, and an average value of the measurements was calculated and converted to a value per 25 mm width, which was used as a peeling strength.

At the peeled interface described above, the porous membrane B may not be peeled off completely to remain on the porous membrane A, but also in this case a value was calculated as a peeling strength at the interface between the porous membrane A and the porous membrane B.

(6) Rate of Air Resistance Increase

Using a Gurley densometer type B manufactured by TESTER SANGYO CO., LTD., a battery separator or a porous membrane A was fixed between a clamping plate and an adapter plate such that wrinkling did not occur, and an air resistance was measured in accordance with JIS P 8117. Measurements were made at arbitrary three points, and the average value was used as an air resistance. An air resistance of the porous membrane A alone and an air resistance of the battery separator in Examples and Comparative Examples were measured, and the rate of air resistance increase was determined by the following equation.

Rate of air resistance increase (%)=(air resistance of battery separator/air resistance of porous membrane $A$ alone)×100

(7) Glass Transition Temperature

A fluororesin solution or a resin solution obtained by dipping a battery separator in a good solvent to dissolve only a fluororesin was applied at an appropriate gap using an applicator to a PET film (E5001 available from TOYOBO CO., LTD.) or a polypropylene film (PYLEN-OT (registered trademark) available from TOYOBO CO., LTD.), predried at 120° C. for 10 minutes, and then peeled. The film obtained was fixed to a metal frame of an appropriate size with heat resistant adhesive tape, and, in such a state, further dried under vacuum at 200° C. for 12 hours to obtain a dry film. A test piece 4 mm wide×21 mm long was cut out from the dry film obtained, and using a dynamic viscoelasticity measuring apparatus (DVA-220 manufactured by IT Keisoku Seigyo Co., Ltd.) at a measuring length of 15 mm, a storage elastic modulus (E') was measured in the range from room temperature to 450° C. under the conditions of 110 Hz and a temperature rise rate of 4° C./min. At an inflection point of the storage elastic modulus (E') at this time, the temperature at the intersection of an extended baseline at or lower than a glass transition temperature and a tangent line showing a maximum slope at or higher than the inflection point was used as a glass transition temperature.

(8) Average Pore Size

A test piece was fixed onto a cell for measurement using double-sided tape. Platinum or gold was vacuum-deposited for several minutes, and SEM observation was performed at 20,000× magnification.

Arbitrary 20 points on an image obtained by SEM measurement were selected, and the average value of pore sizes at the 20 points was used as an average pore size of the test piece.

(9) Average Diameter of Particles

Using an average diameter laser diffraction/scattering particle size distribution analyzer (Microtrac HRA manufactured by Leeds & Northrup Co.), ethylene glycol slurry of particles is added into ion exchanged water to an appropriate concentration to measure the particle size distribution. A cumulative curve was determined taking the total volume of the means of the particles as 100%, and the particle diameter at a point where the cumulative curve reaches 50% was used as an average diameter (μm).

(10) Electrolyte Permeability

White paper (PPC type H (available from ITOCHU PULP & CORPORATION)) is placed on a horizontally-disposed smooth glass plate, and a battery separator obtained in Examples or Comparative Examples was laminated thereon with the porous membrane B facing downward. Thereafter, 100 μL of a polycarbonate reagent was added dropwise from above (from the porous membrane A side) such that the drops were shaped into a substantial circle. At 3 seconds after the addition, the battery separator was peeled off the white paper, and the size (major axis) of a spot due to the polycarbonate reagent permeated into the white paper was read. This procedure was repeated three times, and an average value ($B_L$) was calculated. Also for the porous membrane A alone, measurements were made similarly ($A_L$). Electrolyte permeability (L) was determined from $B_L-A_L$.

Higher values mean more excellent electrolyte permeability.

Assessment

L≥5 mm excellent 5 mm>L≥3 mm good 3 mm>L≥0 mm bad

(11) Evaluation of Curling Properties (Warpage)

Battery separators obtained in Examples and Comparative Examples were cut to a size of 100 mm wide×300 mm long. Static electricity was removed thoroughly with an antistatic brush, and then this sample was placed on a horizontally-disposed glass plate with the porous membrane B facing upward. Both widthwise edges were then fixed by 10 mm. Lift heights at both lengthwise edges were measured, and an average value was determined.

Example 1

(Synthesis of Fluororesin)

KF polymer #1120 (polyvinylidene fluoride resin solution (melting point: 175° C., 12% N-methylpyrrolidone solution) available from Kureha Chemical Industry Co., Ltd.) was used as a fluororesin solution.

The polyvinylidene fluoride resin solution, alumina particles having an average diameter of 0.5 μm, and N-methyl-2-pyrrolidone were mixed at a weight ratio of 14:19:67, and the resulting mixture was placed into a polypropylene container together with zirconium oxide beads ("Torayceram" (registered trademark) beads available from TORAY INDUSTRIES, INC., diameter: 0.5 mm) and dispersed for 6 hours using a paint shaker (manufactured by Toyo Seiki Seisaku-Sho, Ltd.). The dispersion was then filtered through a filter with a filtration limit of 5 μm to prepare a varnish.

The fluororesin concentration in the solution component was 2.1%, and the weight ratio of the fluororesin (solid component) to the particles was 8:92.

The varnish was applied to a porous membrane A (polyethylene porous film, thickness: 16 μm, porosity: 38%, average pore size: 0.15 μm, and air resistance: 280 sec/100 cc Air) by blade coating. The coated membrane was passed through a humidity-controlled zone at a temperature of 25° C. and an absolute humidity of 9.2 g/m³ over 20 seconds, immersed in an aqueous solution containing 5 wt % of N-methyl-2-pyrrolidone for 10 seconds to form a porous membrane B, and then washed with pure water. Finally, the washed membrane was dried by being passed through a hot-air drying furnace at 70° C. to obtain a battery separator having a final thickness of 18.5 μm.

Example 2

A battery separator was obtained in the same manner as in Example 1 except that the mixing ratio of the fluororesin solution to alumina particles to N-methyl-2-pyrrolidone used in Example 1 was 16:19:65.

The concentration of the fluororesin in the solution component was 2.4%, and the weight ratio of the fluororesin (solid component) to the particles was 9:91.

Example 3

A battery separator was obtained in the same manner as in Example 1 except that the mixing ratio of the fluororesin solution to alumina particles to N-methyl-2-pyrrolidone used in Example 1 was 10:14:76.

The concentration of the fluororesin in the solution component was 1.4%, and the weight ratio of the fluororesin (solid component) to the particles was 8:92.

Example 4

A battery separator was obtained in the same manner as in Example 1 except that titanium oxide particles (available from Titan Kogyo, Ltd., trade name "KR-380", average particle diameter: 0.38 μm) was substituted for alumina particles.

Example 5

A battery separator was obtained in the same manner as in Example 1 except that spherical silica particles (available from SAKAI CHEMICAL INDUSTRY CO., LTD., average particle diameter: 1.0 μm) was substituted for alumina particles.

Example 6

A battery separator was obtained in the same manner as in Example 1 except that polymethyl methacrylate cross-linked particles ("Epostar" (registered trademark) MA, type 1002, available from NIPPON SHOKUBAI CO., LTD., average particle diameter: 2.5 μm) was substituted for alumina particles.

Example 7

A battery separator was obtained in the same manner as in Example 1 except that a polyethylene porous film having a thickness of 20 μm, a porosity of 45%, an average pore size of 0.17 μm, and an average air resistance of 240 sec/100 cc Air was used as a porous membrane A.

Example 8

A battery separator was obtained in the same manner as in Example 1 except that the mixing ratio of the fluororesin solution to alumina particles to N-methyl-2-pyrrolidone used in Example 1 was 11:38:51.

The concentration of the fluororesin in the solution component was 2.1%, and the weight ratio of the fluororesin (solid component) to the particles was 3:97.

Example 9

A battery separator was obtained in the same manner as in Example 1 except that the mixing ratio of the fluororesin solution to alumina particles to N-methyl-2-pyrrolidone used in Example 1 was 16:9:75.

The concentration of the fluororesin in the solution component was 2.1%, and the weight ratio of the fluororesin (solid component) to the particles was 18:82.

Example 10

A battery separator was obtained in the same manner as in Example 1 except that the absolute humidity in the humidity-controlled zone was changed from 9.2 g/m$^3$ to 5.2 g/m$^3$.

Example 11

A battery separator was obtained in the same manner as in Example 1 except that the amount of the varnish was adjusted to a final thickness of 19.5 μm.

Example 12

A battery separator was obtained in the same manner as in Example 1 except that the amount of the varnish was adjusted to a final thickness of 17.5 μm.

Example 13

A battery separator was obtained in the same manner as in Example 1 except that a polyethylene porous film having a thickness of 7 μm, a porosity of 45%, an average pore size of 0.14 μm, and an average air resistance of 130 sec/100 cc Air was used as a porous membrane A, and the final thickness was 9.5 μm.

Comparative Example 1

A battery separator was obtained in the same manner as in Example 1 except that the mixing ratio of the fluororesin solution to alumina particles to N-methyl-2-pyrrolidone used in Example 1 was 4:5:91.

The concentration of the fluororesin in the solution component was 0.5%, and the weight ratio of the fluororesin (solid component) to the particles was 9:91.

Comparative Example 2

A battery separator was obtained in the same manner as in Example 1 except that the mixing ratio of the fluororesin solution to alumina particles to N-methyl-2-pyrrolidone used in Example 1 was 26:31:43.

The concentration of the fluororesin in the solution component was 4.5%, and the weight ratio of the fluororesin (solid component) to the particles was 9:91.

Comparative Example 3

A battery separator was obtained in the same manner as in Example 1 except that the mixing ratio of the fluororesin solution to N-methyl-2-pyrrolidone used in Example 1 was 18:82, and alumina particles were not added.

The concentration of the fluororesin in the solution component was 2.2%.

Comparative Example 4

A battery separator was obtained in the same manner as in Example 1 except that the absolute humidity in the humidity-controlled zone was changed from 9.2 g/m$^3$ to 18.0 g/m$^3$.

Comparative Example 5

A battery separator was obtained in the same manner as in Example 1 except that alumina impalpable powder with an average diameter of 13 nm (0.013 μm) (Aerosil Aluminum Oxide C: available from Nippon Aerosil Co., Ltd.) was substituted for the alumina particles used in Example 1.

Comparative Example 6

A battery separator was obtained in the same manner as in Example 1 except that the mixing ratio of the fluororesin solution to alumina particles to N-methyl-2-pyrrolidone used in Example 1 was 18:3:79.

The concentration of the polyamide-imide resin in the solution component was 2.2%, and the weight ratio of the fluororesin (solid component) to the particles was 42:58.

Table 1 shows production conditions for the battery separators of Examples 1 to 13 and Comparative Examples 1 to 6, and the properties of the porous membranes A and the battery separators.

TABLE 1

| | | Particles in porous membrane B | | | | | | | | | | |
|---|---|---|---|---|---|---|---|---|---|---|---|---|
| | Resin concentration (based on solvent) | Type of particles | Average particle diameter (μm) | Particles content (wt %) | Average diameter of particles/ Average pore size of porous membrane A | Humidified condition (g/m³) | absT$_{(1200)}$ | absR$_{(1200)}$ | Rate of Air Resistance increase | Thickness of battery separator (μm) | Electrolyte Permeability | Peeling Strength (N/ 25 mm) | Curling property (mm) |
| Example 1 | 2.1% | Almina | 0.50 | 92 | 3.33 | 9.2 | 0.017 | 0.002 | 111% | 18.5 | good | 1.5 | 5 |
| Example 2 | 2.4% | Almina | 0.50 | 91 | 3.33 | 9.2 | 0.025 | 0.002 | 119% | 18.5 | good | 2.5 | 7 |
| Example 3 | 1.4% | Almina | 0.50 | 92 | 3.33 | 9.2 | 0.013 | 0.001 | 108% | 18.5 | good | 1.1 | 3 |
| Example 4 | 2.1% | Titania | 0.38 | 92 | 2.53 | 9.2 | 0.016 | 0.002 | 113% | 18.5 | good | 1.5 | 5 |
| Example 5 | 2.1% | Silica | 1.00 | 92 | 6.67 | 9.2 | 0.019 | 0.002 | 109% | 18.5 | good | 1.2 | 5 |
| Example 6 | 2.1% | Cross-linked organic particles | 2.50 | 92 | 16.7 | 9.2 | 0.022 | 0.002 | 111% | 18.5 | good | 1.7 | 5 |
| Example 7 | 2.1% | Almina | 0.50 | 92 | 3.33 | 9.2 | 0.017 | 0.001 | 110% | 22.5 | good | 1.3 | 5 |
| Example 8 | 2.1% | Almina | 0.50 | 97 | 3.33 | 9.2 | 0.015 | 0.002 | 110% | 18.5 | good | 1.0 | 2 |
| Example 9 | 2.1% | Almina | 0.50 | 82 | 3.33 | 9.2 | 0.027 | 0.002 | 121% | 18.5 | good | 2.1 | 8 |
| Example 10 | 2.1% | Almina | 0.50 | 92 | 3.33 | 5.2 | 0.018 | 0.003 | 111% | 18.5 | excellent | 1.4 | 5 |
| Example 11 | 2.1% | Almina | 0.50 | 92 | 3.33 | 9.2 | 0.020 | 0.002 | 112% | 19.5 | good | 1.6 | 7 |
| Example 12 | 2.1% | Almina | 0.50 | 92 | 3.33 | 9.2 | 0.015 | 0.002 | 112% | 17.5 | good | 1.5 | 3 |
| Example 13 | 2.1% | Almina | 0.50 | 92 | 3.33 | 9.2 | 0.011 | 0.003 | 111% | 9.5 | good | 1.4 | 5 |
| Comparative Example 1 | 0.5% | Almina | 0.50 | 91 | 3.33 | 9.2 | 0.005 | 0.000 | 105% | 18.5 | bad | 0.3 | 4 |
| Comparative Example 2 | 4.5% | Almina | 0.50 | 91 | 3.33 | 9.2 | 0.040 | 0.040 | 133% | 18.5 | good | 2.9 | 10 |
| Comparative Example 3 | 2.2% | — | — | 0 | — | 9.2 | 0.018 | 0.002 | 111% | 18.5 | good | 3.2 | 11 |
| Comparative Example 4 | 2.1% | Almina | 0.50 | 92 | 3.33 | 18.0 | 0.012 | 0.000 | 108% | 18.5 | bad | 0.7 | 5 |
| Comparative Example 5 | 2.1% | Almina | 0.013 | 92 | 0.087 | 9.2 | 0.017 | 0.002 | 128% | 18.5 | good | 1.7 | 5 |
| Comparative Example 6 | 2.2% | Almina | 0.50 | 58 | 3.33 | 9.2 | 0.018 | 0.002 | 112% | 18.5 | good | 1.4 | 8 |

INDUSTRIAL APPLICABILITY

The battery separator of the present invention has excellent heat resistance and processability (electrolyte permeability, low curling properties) and is characterized in that the air resistance increase due to lamination of a heat resistant resin is extremely small, and it therefore can be very suitably used as a separator for a lithium ion secondary battery.

The invention claimed is:

1. A battery separator comprising: a porous membrane A comprising a polyolefin resin, and a porous membrane B laminated thereon comprising a fluororesin and inorganic particles or cross-linked polymer particles, wherein the particles comprise 80 wt % to 97 wt % of the porous membrane B and have an average diameter being not less than 1.5 times and less than 50 times the average pore size of the porous membrane A, and the fluororesin infiltrates in trace amounts deep into pores of the porous membrane A, and infiltration in trace amounts is determined by Expression 1 and infiltration deep into pores is determined by Expression 2:

$$0.01 \leq absT_{(1200)} \leq 0.30 \quad (1)$$

$absT_{(1200)}$: infrared spectroscopic absorbance of an absorption having a peak at or near 1,200 cm$^{-1}$ per 10 μm thickness of the porous membrane A, as measured by infrared spectroscopy (transmission method) after peeling the porous membrane B off the porous membrane A; and $$0.001 \leq absR_{(1200)} \leq 0.030 \quad (2)$$

$absR_{(1200)}$: infrared spectroscopic absorbance of a maximum peak at or near 1,200 cm$^{-1}$, as measured by infrared spectroscopy (reflection method) on the surface of the porous membrane A that is opposite to the porous membrane B.

2. The battery separator according to claim 1, wherein the inorganic particles are at least one selected from silica, titanium dioxide, and alumina.

3. The battery separator according to claim 1, wherein the cross-linked polymer particles are at least one selected from cross-linked polystyrene particles, cross-linked acrylic resin particles, and cross-linked methyl methacrylate particles.

4. A method of producing the battery separator according to claim 1, comprising (i) and (ii):

(i): Applying a coating solution (varnish) to the porous membrane A comprising a polyolefin resin, the coating solution comprising a fluororesin and inorganic particles or cross-linked polymer particles, wherein the concentration of the fluororesin in the solution component is 1 wt % to 3.5 wt %, and then passing the coated porous membrane A through a humidity-controlled zone at an absolute humidity of 5 g/m$^3$ or more but less than 10 g/m$^3$ for 3 seconds or more but less than 30 seconds to form a fluororesin membrane on the porous membrane A; and (ii): Immersing the composite membrane obtained in (i), in which the fluororesin membrane is laminated, in a coagulation bath to convert the fluororesin membrane into a porous membrane B, and washing and drying the composite membrane to obtain a battery separator.

5. A method of producing the battery separator according to claim 2, comprising (i) and (ii):

(i): Applying a coating solution (varnish) to the porous membrane A comprising a polyolefin resin, the coating solution comprising a fluororesin and inorganic particles or cross-linked polymer particles, wherein the concentration of the fluororesin in the solution component is 1 wt % to 3.5 wt %, and then passing the coated porous membrane A through a humidity-controlled zone at an absolute humidity of 5 g/m$^3$ or more but less than 10 g/m$^3$ for 3 seconds or more but less than 30 seconds to form a fluororesin membrane on the porous membrane A; and (ii): Immersing the composite membrane obtained in (i), in which the fluororesin membrane is laminated, in a coagulation bath to convert the fluororesin membrane into a porous membrane B, and washing and drying the composite membrane to obtain a battery separator.

6. A method of producing the battery separator according to claim 3, comprising (i) and (ii):

(i): Applying a coating solution (varnish) to the porous membrane A comprising a polyolefin resin, the coating solution comprising a fluororesin and inorganic particles or cross-linked polymer particles, wherein the concentration of the fluororesin in the solution component is 1 wt % to 3.5 wt %, and then passing the coated porous membrane A through a humidity-controlled zone at an absolute humidity of 5 g/m3 or more but less than 10 g/m3 for 3 seconds or more but less than 30 seconds to form a fluororesin membrane on the porous membrane A; and (ii): Immersing the composite membrane obtained in (i), in which the fluororesin membrane is laminated, in a coagulation bath to convert the fluororesin membrane into a porous membrane B, and washing and drying the composite membrane to obtain a battery separator.

* * * * *